(12) United States Patent
Wegner

(10) Patent No.: US 6,247,480 B1
(45) Date of Patent: Jun. 19, 2001

(54) PRESSURE WASHER CONTAINMENT ASSEMBLY AND METHOD WITH A PASSIVE SKIMMER

(75) Inventor: Paul Wegner, San Carlos, CA (US)

(73) Assignee: EZ Environmental Solutions Corporation, Menlo Park, CA (US)

( * ) Notice: Subject to any disclaimer, the term of this patent is extended or adjusted under 35 U.S.C. 154(b) by 0 days.

(21) Appl. No.: 09/336,124

(22) Filed: Jun. 18, 1999

(51) Int. Cl.[7] .............. B08B 3/02; B08B 13/00; B01D 21/02; B01D 36/04
(52) U.S. Cl. .............. 134/111; 210/299; 210/487; 210/493.1; 210/532.1; 210/538; 210/540
(58) Field of Search .............. 134/109, 111; 210/299, 487, 493.1, 532.1, 538, 540, 776, 804

(56) References Cited

U.S. PATENT DOCUMENTS

| | | | |
|---|---|---|---|
| 2,139,096 | * 12/1938 | Piquerez | 134/111 X |
| 2,426,817 | * 9/1947 | Charlton et al. | 134/111 X |
| 2,834,359 | * 5/1958 | Kearney | 134/111 X |
| 4,543,182 | * 9/1985 | Gramse et al. | 134/111 X |
| 5,127,417 | 7/1992 | Tromblee et al. | 134/111 |
| 5,360,555 | * 11/1994 | Batten | 210/540 X |
| 5,374,352 | * 12/1994 | Pattee | 134/111 X |
| 5,560,831 | 10/1996 | Bladen et al. | 210/704 |
| 5,785,067 | 7/1998 | Kosofsky | 134/102.1 |
| 5,803,982 | 9/1998 | Kosofsky et al. | 134/10 |

OTHER PUBLICATIONS

Pressure Island, "The Next Generation in Cleaning" Marketing Flier, 1998.

* cited by examiner

*Primary Examiner*—Philip R. Coe
(74) *Attorney, Agent, or Firm*—Beyer Weaver & Thomas

(57) ABSTRACT

A containment assembly for use with a pressure washing apparatus to contain and collect the relatively light weight contaminants from run-off of a washing fluid after being flowed over an object to be cleaned. The containment assembly includes a settling compartment for collection of the run-off washing fluid therein, and a containment compartment in gravity flow fluid communication with a surface of the collected washing fluid in the settling compartment. As the lightweight contaminants at the surface of the washing fluids gravity flow into the containment compartment, they are contained and collected therein. A fluid extraction assembly is in fluid communication with the contained washing fluid in the containment compartment through an opening therein vertically disposed below a predetermined operational fluid level of the contained washing fluid. The extraction assembly is adapted to extraction the contained washing fluid through the opening in a manner maintaining the gravity flow of the collected washing fluid into the containment compartment.

13 Claims, 5 Drawing Sheets

PRESSURE WASHER CONTAINMENT ASSEMBLY AND METHOD WITH A PASSIVE SKIMMER

BACKGROUND OF THE INVENTION

1. Field of Invention

The present invention relates generally to pressure washer apparatus, and more particularly, to methods and apparatus for separating and containing lower-density or lightweight contaminants from contaminated washing fluids for use in the pressure washing apparatus.

2. Description of the Relevant Art

Contamination of the environment by man-made substances has been considered a serious world-wide problem. Recently, concern about contamination of earth, air, and groundwater by oil, toxic chemicals, and other hazardous wastes has expanded beyond large-scale industry to encompass the activities of many small businesses including automobile service stations, and many others. Both government regulations and social outcry have placed tremendous pressure on these businesses to avoid discharging hazardous wastes into the environment in the course of ordinary business activities.

Many businesses partake in activities which are likely to produce waste which may be harmful to the environment. For example, in an automobile service station, washing or steam-cleaning auto parts, e.g., an automobile engine, often causes engine oil, gasoline, and other chemicals to enter a storm drain system, or other waterways, thereby leading to the potential contamination of groundwater. In addition, those who service remotely located equipment generally have a need to wash the equipment without discharging hazardous waste into the environment. By way of example, persons who service roof-mounted air conditioners that contain lubricating petrochemicals, trapped pollutants, or other chemicals are not permitted to wash the equipment in a manner that could cause chemicals to run off the roof and into the surrounding environment.

To address these concerns, portable, closed-loop pressure washing equipment has become widely available which may recover oil, chemicals, and other hazardous materials from an object which is being washed. These pressure wash assemblies may efficiently recirculate, heat, and repeatedly filter a washing agent to minimize the quantity of waste material produced during a washing process. Typical of such systems are disclosed in U.S. Pat. Nos.: 5,673,715; 5,785,067 and 5,803,982, incorporated herein by reference.

These zero-discharge, closed-loop wash apparatus typically deploy a multi-step contaminant removal process designed to independently separate the heavier weight or higher density contaminants, relative the density of the washing fluid, as well as separate the lighter weight or lower density contaminants from the washing agent. A collection basin of the wash apparatus, for example, may be configured to remove the heavier weight contaminants through the application of filtration baskets or through sediment settling of the coarser heavier sediments along the bottom of the collection basin. The medium weight or medium density contaminants, on the other hand, may remain suspended in the washing fluid, where they may be removed by filtration through micron filters or the like. In some designs, a succession of micron filters may be used to remove successively smaller particulates and molecules from the washing agent.

The lightweight contaminants, such as gasoline, oils and lightweight chemicals, are caused to gravitate toward and float on the surface of the washing fluid. Eventually, these contaminants accumulate at the surface of the washing agent, and require periodic removal. Some conventional assemblies may effectively, or at least partially, filter out these contaminants without any additional componentry. However, these hazardous wastes are typically either not isolated, or are not consistently or efficiently filtered out of the washing fluid.

One technique for removal of these highly abundant forms of contaminant is a belt skimming device. As illustrated in FIG. 1, the belt skimmer device 10 typically includes a belt 11 which is capable of extracting the lightweight contaminants, using selective surface tension properties, and transporting them to a holding compartment 12. The efficiency and maximal removal rate of the belt skimmer 11 is thus dependent on contaminant abundance as well as surface tension properties of the low density contaminant 13, the washing fluid 15 and the belt 11. While the belt skimmer device 10 may be efficient in the presence of abundant contaminants, during low contaminant levels, the washing fluid 15 tends to cling to the belt 11. This disadvantageously compromises efficiency of the belt skimmer device 10 and additionally removes washing fluid from the closed pressure washing system. Further, the presence of a motor increases the maintenance and power consumption costs, as well as increasing the potential for igniting flammable contaminants an electrical shock.

Another conventional low-density contaminant removal system is an absorbent sock system (not shown) which filters the contaminated washing fluid through a plurality of absorbent socks whose absorption properties are used to remove contaminants. The primary drawback of this approach, however, is that socks introduce a new residual hazardous waste product to the environment. Moreover, although this removal system is mechanically less complex, the contaminant removal is disadvantageously restricted to only liquid contaminants. Another disadvantage to this system is that separate chambers are required for the absorbent socks. Ultimately, this increases the fabrication and costs, as well as increasing maintenance. Finally, the absorbent sock system frequently restricts flow of the washing fluid which in turn reduces output performance.

Yet another conventional, low-density contaminant removal device are chemical fluculation systems which in effect encapsulate the targeted contaminants. While these systems are capable of solid contaminant removal, the encapsulating substance must be manually supplied in batches. Accordingly, this task is relatively laborious, time consuming and requires active monitoring and maintenance. Further, the chemicals must be added in adequate proportions based on contaminant influx and thus are not efficient in a continuously variable cleansing application. Further, the high cost of these chemicals may not be comfortable for many operations and small businesses which may compromise their continuous application and effectiveness.

In view of the foregoing, it is apparent that improved low-density contaminant removal techniques for a pressure washer are desirable.

SUMMARY OF THE INVENTION

The present invention relates to a containment assembly for use with a pressure washing apparatus having a settling compartment adapted to collect the run-off of a washing fluid after being flowed over an object to remove a contaminant. The relatively lightweight contaminants in the collected washing fluid are caused to gravitate to the surface of the collected washing fluid therein. A containment compartment is provided in gravity flow fluid communication with the surface of the collected washing fluid in the settling compartment such that the lightweight contaminants at the surface thereof flow into the containment compartment for containment of the lightweight contaminants and the washing fluid therein. A fluid extraction assembly is in fluid communication with the contained washing fluid in the containment compartment through an opening therein vertically disposed below a predetermined operational fluid level of the contained washing fluid. The extraction assembly is adapted to extract the contained washing fluid through the opening in a manner maintaining the gravity flow of the collected washing fluid into the containment compartment.

In one configuration, the settling compartment includes a containment weir having an upper ledge portion formed and dimensioned to prevent the gravity flow of the collected washing fluid therein into the containment compartment when the surface thereof is substantially at or below the elevation of the upper ledge portion. This upper ledge portion is further configured to enable the surface of the collected washing fluid to gravity flow thereover and into the containment compartment when the surface thereof is above the elevation of the upper ledge portion.

In another arrangement, the settling compartment is structured to create a substantially uniform, relatively slow, non-turbulent flow toward the upper ledge portion such that the relatively lightweight contaminants in the collect washing fluid are caused to float to the surface therein. In contrast, the relatively heavyweight contaminants in the collected washing fluids are caused to substantially settle toward a bottom of the settling compartment.

A filter device may be deployed having an inlet side in fluid communication with the washing fluid collected in the filter compartment, and an outlet side adapted to provide filtered washing fluid from the filter compartment to the pressure washing apparatus. In another configuration, a skimming device is included which is adapted to remove the contained lightweight contaminants in the containment compartment. This skimming device may include a discard port in fluid communication with the contained lightweight contaminants in the containment compartment for extraction thereof.

In another aspect of the present invention, a closed-loop pressure washer assembly is provided for washing an object having a contaminant. The pressure washer includes a subfloor assembly for supporting an object, and which is adapted to direct excess run-off washing fluids, which are flowed over the object, towards a run-off portion thereof. A settling compartment is adapted to collect the run-off of a washing fluid after being flowed over the object to remove the contaminant wherein the relatively lightweight contaminants in the collected washing fluid are caused to gravitate to the surface of the collected washing fluid therein. The pressure washer further includes a containment compartment in gravity flow fluid communication with the surface of the collected washing fluid in the settling compartment. These lightweight contaminants flow into the containment compartment where they are contained together with the washing fluid therein. A pressure washer, in extraction fluid communication with the contained washing fluid in the containment compartment, is included to flow the withdrawn fluid over the object during a cleaning procedure. The pressure washer cooperates between the containment compartment and the settling compartment to maintain the gravity flow from the collected washing fluid into the containment compartment.

The pressure washing apparatus may include a filter device having an inlet filter side in fluid communication with the contained washing fluid contained in the settling compartment, and an outlet side adapted to provide filtered fluid from the settling compartment to the pressure washer. A filter compartment is formed adjacent the containment compartment, and dimensioned for receipt of a filter device therein. Fluid communication therebetween is established through an opening to provide a reservoir of washing agent to the pressure washer.

In yet another aspect of the present invention, a method is provided for separating a lightweight contaminant from a washing fluid in a pressure washing apparatus to wash an object. The method includes enabling the relatively lightweight contaminants of collected washing fluid in a settling compartment to gravitate toward the surface of the collected washing fluid therein; and gravity flowing the surfaced lightweight contaminants and a portion of the collected washing fluid, as a unit, into a containment compartment for containment thereof. The present inventive method further includes selectively withdrawing portions of the contained washing fluid from the containment compartment in a manner maintaining the gravity flow of the surfaced lightweight contaminants and the portion of the collected washing fluid into the containment compartment. Further, the contained lightweight contaminant are contain therein.

In one embodiment, the method prevents the gravity flow through a containment weir when the surface of the collected washing fluid is substantially at or below the elevation of an upper ledge portion of the containment weir, and enables the gravity flow when the surface thereof is above the elevation of the upper ledge portion.

The present inventive method may further include selectively removing the contained lightweight contaminants from the containment compartment by discarding the lightweight contaminants through a discard port in fluid communication therewith.

BRIEF DESCRIPTION OF THE DRAWINGS

The present invention is illustrated by way of example, and not by way of limitation, in the figures of the accompanying drawings in which.

DETAILED DESCRIPTION OF THE PREFERRED EMBODIMENTS

Figure 1:
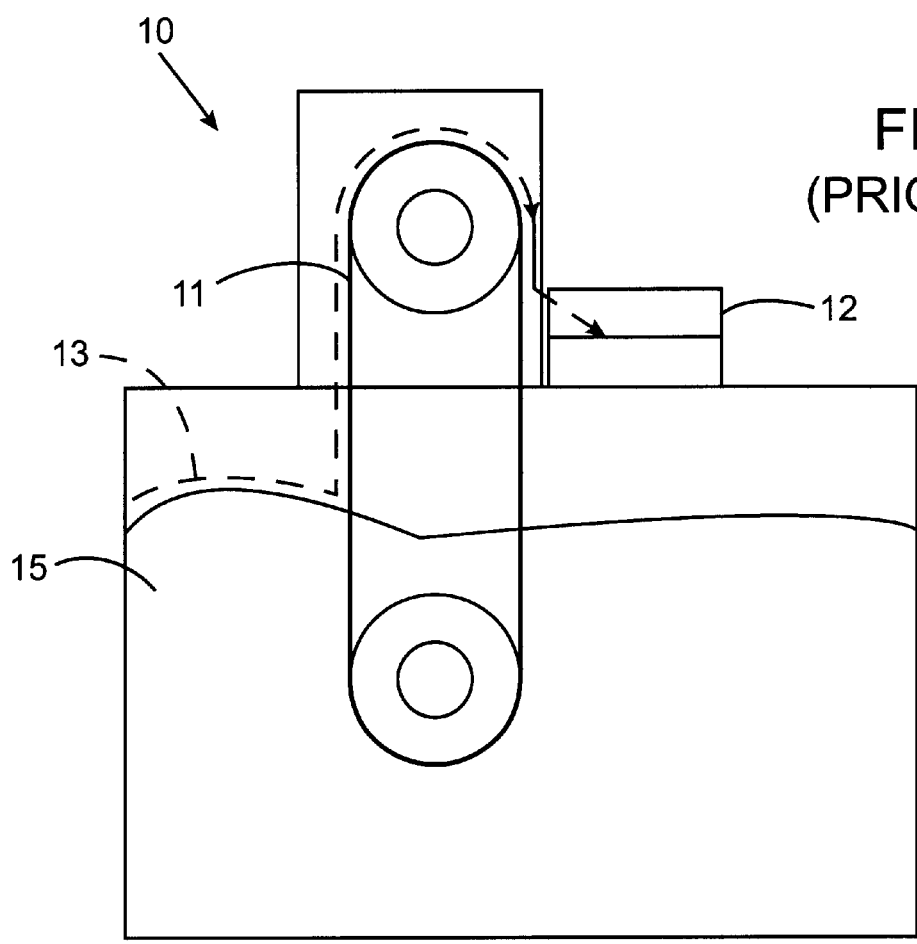
FIG. 1 is a front elevation view if a conventional belt skimming device.

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Attention is now directed to FIGS. 2–5 where a closed-loop containment assembly, generally designated 20, is illustrated for use with a pressure washer 21. The containment assembly 20 includes a collection basin 22 providing a settling compartment 23 adapted to collect the run-off of a washing fluid after being flowed over an object (not shown) to remove a contaminant. The relatively light weight contaminants 25 in the collected washing fluid are caused to gravitate to the surface of the collected washing fluid therein. The collection basin 22 further includes a containment compartment, generally designated 26, which is in gravity flow fluid communication with the surface portion 27 of the collected washing fluid 28 in the settling compartment 23 such that the lightweight contaminants 25 at the surface portion 27 thereof flow into the containment compartment 26 for containment of the light weight contaminants 29 and the washing fluid 30 therein. A fluid extraction assembly 31 is in fluid communication with the contained washing fluid 30 in the containment compartment 26 through an opening 32 therein vertically disposed below a predetermined operational fluid level (i.e., surface 35) of the contained washing fluid 30. The extraction assembly 31 is adapted to extract the contained washing fluid through the opening 32 in a manner maintaining the gravity flow of the collected washing fluid 28 into the containment compartment 26.

Accordingly, a closed-loop pressure washing apparatus 33 (FIG. 2) is provided which substantially simplifies collection and containment of the lower density or light weight contaminants 25 floating on the surface of the collected washing fluids. This is performed by providing a containment assembly 20 having an enclosed containment compartment 26 in gravity flow communication with the surface portion 27 of the collected washing fluid 28 in the settling compartment 23. As the surface portion 27 of the washing fluid 28 is gravity flow delivered or poured into the containment compartment 26, the light weight contaminants 25 floating on the surface 35 of the washing fluid 30 in the containment compartment 26 are contained, and are not permitted to backflow and redistribute back into the other areas of the collection basin. The contained washing fluid 30 in the containment compartment 26 is then extracted for use by a pressure washer to clean the targeted object. Accordingly, the extraction of the washing fluid from the settling compartment performs the function of providing pressurized washing fluid to the pressure washer 21, while further functioning to maintain the potential head or height differential between the surface 27 of the collected washing fluid 28 and the surface 35 of the contained washing fluid 30 in the containment compartment 26.

Inherently, the present invention substantially simplifies containment of the lightweight contaminants by eliminating the cooperative moving parts of the prior art skimming and collection assemblies. Maintenance costs are thus reduced by eliminating the need for expensive replacement parts, such as motors and belt drives.

Briefly, it will be understood that the term "washing fluid" is applied to a washing agent used to wash contaminants from the surface of an object. For instance, water is the most typical washing agent, but may further include cleansing additives such as detergents, soda ash, etc. Moreover, the terms "lower-density contaminants" or "light weight contaminants" are referred to as contaminants with a specific gravity less than that of the washing fluid. Thus, the light weight contaminants naturally separate and float to the surface of the collected washing fluid. Such contaminants may include oil, gasoline, foams, etc. In contrast, it will be understood that the terms "heavier-density contaminants" or "heavy weight contaminants" are referred to as contaminants with a specific gravity greater than that of the washing fluid.

Figure 2:
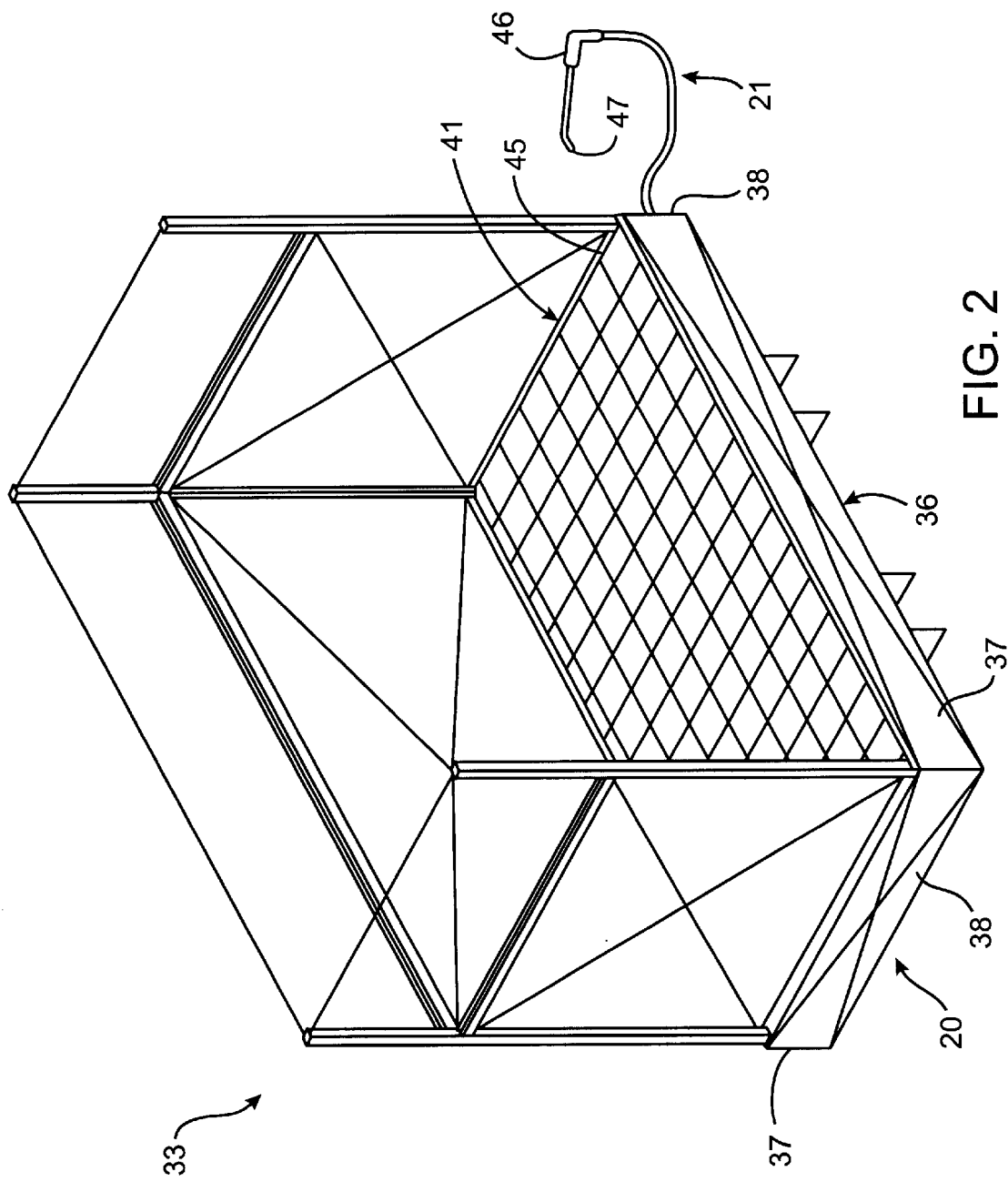
FIG. 2 is a top perspective view of a pressure washing apparatus constructed in accordance with the present invention.
Figure 3:
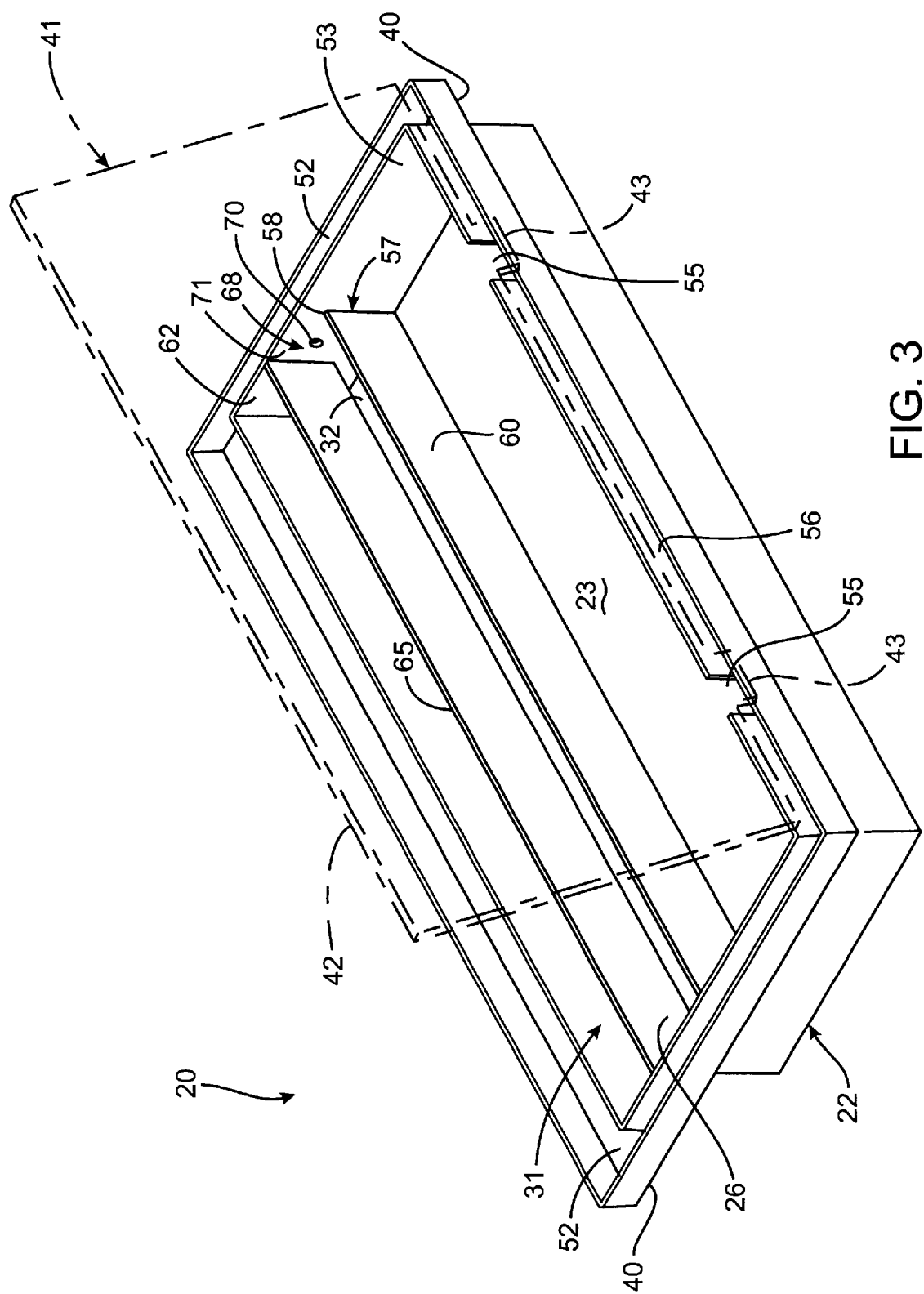
FIG. 3 is an enlarged top plan view of a containment assembly of the pressure washing apparatus of FIG. 2.

Referring now to FIGS. 2 and 3, the pressure washing apparatus 33 includes a base frame 36 which is a generally rectangular structure comprising four base side frames, although it should be appreciated that base frame 36 may take on any suitable shape. The base frame 36 preferably includes an upper support frame having lateral beams 37 that are joined to cross beams 38 which are formed and dimensioned to receive and vertically support the containment assembly 20 through peripheral shoulder portions 40 of the collection basin 22. It will be understood, however, that these assemblies may be positioned underneath the cross-beams and the lateral beams as well. The lateral beams 37 and the cross beams 38 may be welded aluminum tube stock, structural fiberglass, as for example EXTREN®, which is commercially available from MMFG, or any other lightweight, sturdy material which is essentially non-conductive and non-corroding. The collection basin 22, similarly, may be composed of any suitable material, such as stainless steel, aluminum, molded high-density polypropylene, or an equivalent sealed pool or basin with perimeter walls that are strong enough to contain water.

A subfloor assembly 41 is provided to support the object (not shown) above the containment assembly 20. This subfloor assembly 41 includes a support floor 42 (FIG. 3) which is preferably hingeably attached to the peripheral shoulder portions 40 through hinges 43. This hinged attachment enables the support floor 42 to be moved to an uncovered position for maintenance access to the containment assembly 20. An optional metal or fiberglass grate assembly 45 (FIG. 2) may be positioned atop the support floor to support the object so that it does not come into direct contact therewith. The grate assembly 45 is adapted to be lifted off the support floor to the containment assembly 20 and the collection basin 22 positioned below. Hence, the articles to be washed can be supported atop this grate and over the subfloor assembly 41 for cleaning.

In the preferred embodiment, the containment assembly 20 is structured for use in connection with a conventional spray pressure washer 21. As shown in FIG. 2, these spray pressure washers 21 provide a mechanism to pressure wash the object using a conventional pressure wand 46 and a compatible stainless steel spray nozzle 47. The containment assembly 20 and the spray pressure washer 21 together cooperate to form the closed-loop pressure washing apparatus 33. Briefly, the pressure washer 21 is coupled to the outlet side 48 of a filter device 50 (FIGS. 4 and 5) to deliver filtered washing fluid to the pressure wand 46, via a pressure pump (not shown). The containment assembly preferably includes a support housing (not shown) which contains the necessary plumbing, motors, pumps, etc. to operate the containment assembly 20 and provided pressurized filtered washing agent to the pressure washer 21. The pressure pump may be provided any conventional high pressure pump assembly, and is preferably capable of delivering a variable pressure for a selective pressure spray application. One such conventional pressure pump, for example, is that provided by WANNER, Model No. MD3EABJSSECA, which is capable of providing a low pressure spray in the range of about 50 psi and a high pressure spray in the range of about 3000 psi. Moreover, the containment assembly may heat the washing agent to a substantially high temperature in the range of about 80° F. to about 212° F., and more preferably in the range of about 140° F. to about 160° F.

Initially, an empty or near empty settling compartment 23 may be filled with washing fluid to an initial depth which may be less than or substantially equal to the depth of the collected washing fluids during operation. In general, however, the initial depth must be suitable to prime the system and to ensure proper pump operation and proper filtration (as will be discussed in more detail below). To initially fill the settling compartment, an external washing fluid or water source, such as a faucet or a hose (not shown) may be separately coupled to settling compartment 23. This external water source provides a fresh supply of water for maintaining the operational depth due to water loss, such as overspray and evaporation, during normal pressure washing use.

The pressure washer 21 itself may be applied to fill the settling compartment to its operational depth. In this embodiment, the pressure washer is preferably coupled to the external washing fluid reservoir, through valving (not shown), whereupon the run-off washing fluid is employed to replenish or fill the settling compartment. Once the object is pressure sprayed, the run-off washing fluid, which includes any loose contaminants, surface oils, etc., from the surface of the object, passes directly into the settling compartment for collection thereof.

Briefly, as shown in FIG. 3, when the run-off washing agent falls upon the support floor 42 of the subfloor assembly 41, it is directed into peripheral gutters 52 surrounding the edges of the collection basin 22. These gutters 52 then gravitationally direct the flow of the collected run-off washing agent into a collection end 53 of the settling compartment 23. This is preferably performed by providing a pair of gutter openings 55 in an interior gutter wall 56 of the gutter 52. To further divert the excess run-off washing agent toward the gutter openings 55, the subfloor assembly, and/or the frame assembly, is configured to gravitationally flow the run-off thereto. This may be performed by tilting the frame assembly, the entire containment assembly and/or the gutters to gravitate the run-off washing agent toward the gutter openings 55. A central portion of the support floor 42 may further be bowed or configured to gravitationally direct the run-off toward the gutters or gutter openings 55.

As the washing fluid continues to collect in the generally rectangular-shaped settling compartment 23, separation of the lighter density and heavier density contaminants, relative the density of the washing agent, systematically commences. This natural gravity separation is facilitated as the collected washing fluid flows from the collection end 53 toward a containment weir 57 of the collection basin 22 in a relatively slow, non-turbulent manner. In such an environment, a substantial portion of the suspended lightweight contaminants will gravitate toward the top surface portion 27 of the collected washing agent. In contrast, the heavy weight contaminants will gravitate toward the bottom of the settling compartment 23 for collection thereof, while the intermediate weight contaminants remain suspended in the washing agent. Accordingly, the contaminants will passively separate based on their varying densities. This natural gravity filtration may be performed by providing an adequate settling time and a relatively slow flow rate (e.g., about 0.5 gallons/min. to about 8.5 gallons/min, and more preferably about 2.0 gallons/min.) along a flowpath from the collection end 53 to the containment weir 57, downstream thereof.

Alternatively, another technique to filter out larger or coarser sized contaminants from the run-off washing agent is to include a filter device (not shown) in the path of the flow into the settling compartment 23 through the gutter openings 55. This filtering device is preferably provided by a mesh filtering basket placed in the settling compartment 23 which is adapted to filter out very coarse contaminants typically on the order of about fifty (50) thousandths of an inch and greater. Such coarse contaminants include metal shards, and other debris resulting from the cleaning process. Different mesh sizes, of course, may be employed to accommodate and filter out different substances. These baskets may then be periodically removed from the settling compartment for cleaning thereof.

Figure 5:
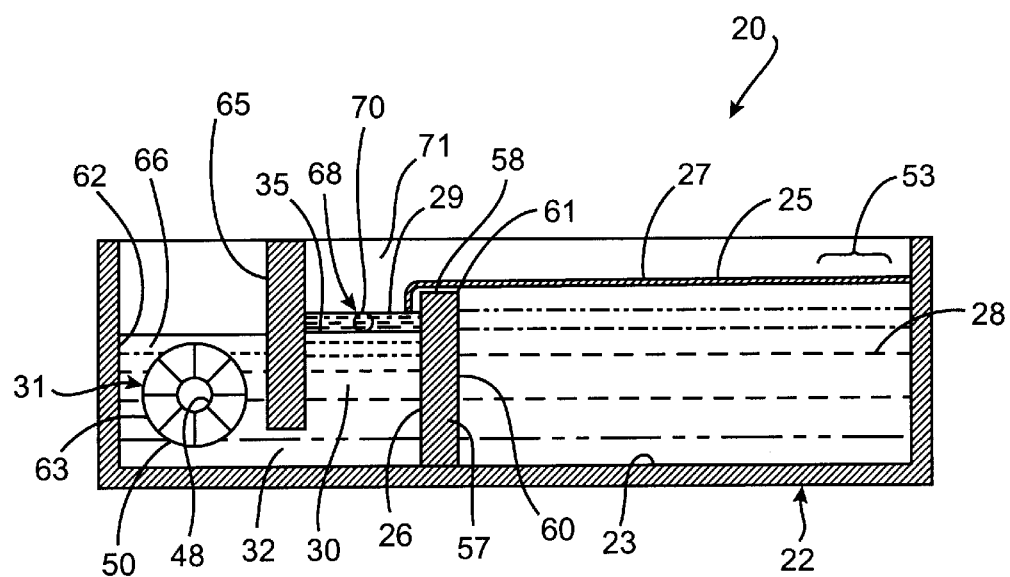
FIG. 5 is an enlarged side elevation view, in cross-section, of the containment assembly, taken substantially along the plane of the line 5—5 in FIG. 4.

As above-mentioned, the settling compartment 23 continues to fill continuously until the fluid level of the collected washing fluid 28 rises above a predetermined elevation in the settling compartment. This predetermined elevation is determined by an upper ledge portion 58 of the containment weir disposed transversely across the settling compartment (FIG. 5). This containment weir 57, therefore, functions as a fluid barrier to prevent gravity flow of the collected washing fluid 28 into the containment compartment 26 when the actual fluid level or the surface portion 27 of the collected washing fluid 28 is substantially at or below the elevation of the upper ledge portion 58. This differential height assures that the surface portion 27 of the collected washing fluid 28 in the settling compartment 23 is at least above the surface 35 of the contained washing fluid 30 in the containment compartment 26 so that when the flow therebetween commences, the flow is gravity based and only in direction from the settling compartment 23 to the containment compartment 26.

In the preferred embodiment, the containment weir 57 is positioned across the settling compartment 23 in an orientation generally transverse to the general flow direction of the collected washing fluid therein. The containment weir includes an interior face portion 60 which facilitates collection of the settled contaminants, and prevents them from flowing into the containment compartment 26. By providing an interior face portion 60 which upstands from the bottom floor of the settling compartment 23 in a substantially vertical manner, a formidable impasse is constructed for the settled heavy weight contaminants to over come and pass over given the relatively slow and non-turbulent flow of the washing fluid. It will be appreciated, however, that the orientation of the interior face portion 60 may be sloped in either direction as long as the angle, relative the bottom surface of the settling compartment, is relatively steep.

As the run-off washing fluid continues to pass through the gutter openings 55 and into the settling compartment 23, the surface portion 27 of the collected washing fluid will eventually flow over the weir upper ledge portion 58 and gravity flow into the containment compartment 26. The lightweight contaminants 25 floating on or gravitating toward the washing fluid surface portion 27, as well as the suspended intermediate weight contaminants therein, will passively gravity flow into the containment compartment for containment. Such passive flow continues until the fluid level of the collected washing fluid is substantially at or below the elevation of the weir upper ledge portion 58.

Thus, during operation of the pressure washer 21, the operational fluid level of the collected washing fluid 28 is generally maintained just above the upper ledge portion 58 of the containment weir 57 to allow for continual and passive removal of the lower density contaminants from the settling compartment 23. Inherently, during continuous operation, the flow rate of the lightweight contaminants and collected washing fluid over the containment weir 57 is generally substantially similar to that of the incoming washing fluid and contaminants flowing into the collection end 53 through the gutter openings 55. A flow pattern is thus established such that the lower density or light weight contaminants passively rise to the surface portion 27 of the washing fluid in the settling compartment, and flow over the weir upper ledge portion 58 and into the containment compartment 26.

During flow of the collected washing fluid into the containment compartment 26 from the settling compartment, it is desirable to minimize the disturbance of the layered washing fluids (i.e., the separated lightweight contaminants and the washing fluids) as they flow over the weir upper ledge portion 58. As a consequence, remixing between the separated lightweight contaminants and the washing fluids is also reduced.

One technique is to slow the velocity of the washing fluid as it flows over the containment weir 57. Not only is this beneficial to minimize the flow disturbance, but the slow flow over the upper ledge portion also increases the separation time of the washing fluids in the settling compartment. This may be performed by providing a relatively wide spillway or upper ledge portion 58, in comparison to the flow rate of the washing fluids over the weir 57. For example, for a flow rate of about 0.4 ft$^3$/min. (3.0 gallons/min) to about 0.8 ft$^3$/min. (4.50 gallons/min), a spillway of about 8 feet in length and about 6 inches in height would have a velocity over the upper ledge portion in the range of about 0.1 ft/min to about 0.2 ft/min.

It is further desirable to minimize any blockage or other structural restrictions caused by the containment weir 57 so that the flow over the upper ledge portion 58 is substantially uniform and in a sheet-like manner. These disruptions may disadvantageously create eddies or uneven flow of the washing fluid which leads to an inconsistent pressure profile.

To facilitate uniformity of the gravity flow over the entire spillway width of the upper ledge portion 58, a flow facilitating device (FIG. 5) is utilized to reduce the surface tension across the upper ledge portion to promote smooth flow. The flow facilitating device 61 preferably extends over and atop the upper ledge portion 58 of the containment weir, and is composed of a material which reduces the surface tension with washing fluid. Accordingly, the spillover is less sensitive to structural variations, such as the tub angle, to promote smooth, even flow. In the preferred embodiment, the surface tension resistant material may be provided by a felt material, plastic layer or other suitably smooth surface or the like having a property of equalizing the flow over the weir.

Another technique to reduce remixing disturbance of the contained washing fluids 30 in the containment compartment 26 is to minimize the height differential between the surface portion 27 of the collected washing fluid 28 and the surface 35 of the contained washing fluid 30. In this manner, when the washing fluid and separated light weight contaminant 25 flows over the containment weir 57, the intermixing caused by the drop over the upper ledge portion 58 is reduced. It will be appreciated, however, that a pressure head must be maintained therebetween to enable gravity flow of the washing fluid when it flows over the upper ledge portion 58. In the preferred embodiment, this height differential is maintained in the range of about ½ inch to about 1 inch.

Once the separated and layered portions of the washing fluid 28 and the light weight contaminants have passed over the containment weir 57 and into the containment compartment 26, the lightweight contaminants 29 will accumulate and remain contained in the containment compartment for collection thereof. The contained washing fluids 30 gravity flowed into the containment compartment are naturally caused to again separate therein based on their different densities. However, since the separated washing fluids and the light weight contaminants flowed into the containment compartment with minimal disturbance, separation therein is performed much more quickly.

The containment compartment 26 is generally in the shape of an elongated trough which is formed to retain and accumulate the lightweight contaminants therein over time. The surrounding walls defining the containment compartment 26 are sufficiently tall to preclude any backflow of the floating light weight contaminants 29 back into the settling compartment, or permit any forward flow thereof into a filter compartment 62 disposed adjacent the containment compartment 26. Thus, dispersion of the contained light weight contaminants 29 into the adjacent compartments of the collection basin is substantially minimized. This arrangement, moreover, functions as a large storage vehicle for the oils, and other light weight debris collected in the containment compartment which in some instances eliminates the need for additional storage units.

In accordance with the present invention, during operation of the pressure washing assembly 33, the inflow of the collected washing fluids 28 and the light weight contaminants 25 into the containment compartment 26 from the settling compartment 23 is adapted to be substantially the same as the outflow of the contained washing fluid 30 from the containment compartment (as will be described in greater detail below). This substantial equality of inflow and outflow of the washing fluids to and from the containment compartment 26 maintains an operating fluid level of the contained washing fluid 30 in the containment compartment within a predetermined range vertically below the upper ledge portion 58 of the collection weir 57. This height differential between the respective surfaces of the washing fluids assures the gravity flow between the settling compartment 23 and the containment compartment 26.

As above indicated, the fluid extraction assembly 31 cooperates with the pressure washer 21 to provide washing fluids which are extracted from the containment compartment 26 during operation thereof. Briefly, an inlet side 63 of the filter device 50 is in fluid communication with the contained washing fluids 30, while an outlet side 48 thereof delivers filtered washing fluid to the pressure wand 46 of the pressure washer 21. Hence, operation of the pressure washer 21 essentially drives the closed-loop assembly as the washing fluids drawn from the containment compartment 26 pass through the pressure washer 21 and over the object to be washed. Subsequently, the loose contaminants and the run-off washing fluids are directed into the collection end 53 of the settling compartment 23. After contaminant separation, portions of the collected washing fluids and the floating light weight contaminants 25 gravity flow back into the containment compartment to complete the circuit.

In the preferred embodiment, the fluid extraction assembly 31 includes an elongated filter compartment 62 which is formed to house the filter device 50 therein. This filter compartment 62 extends adjacent and substantially parallel to the settling compartment 23, on the side opposite the settling compartment 23. A filter weir 65 extends laterally across the containment assembly 20 define and separate the filter compartment 62 from the containment compartment 26.

Fluid communication between the containment compartment 26 and the filter compartment 62 is provided by opening 32 which extends through the filter weir 65. This opening 32 is vertically disposed at an elevation below the predetermined operational fluid level of the contained washing fluid 30 so as to prevent or minimize passage of the floating light weight contaminants 29 into the filter compartment 62 during operation of the filter device 50. In this manner, the accumulated light weight contaminants 29 are contained and maintained in the containment compartment 26. FIG. 3 best illustrates that the opening 32 preferably extends continuously, at a bottom of the filter weir 65, from one end to an opposite end thereof. The opening is preferably oriented at least about ½ inch to about 1 inch below the anticipated operational fluid level of the washing fluids in the containment compartment. The opening 32, it will be understood, need not be continuous and may be provided by a plurality of spaced-apart openings.

Figure 4:
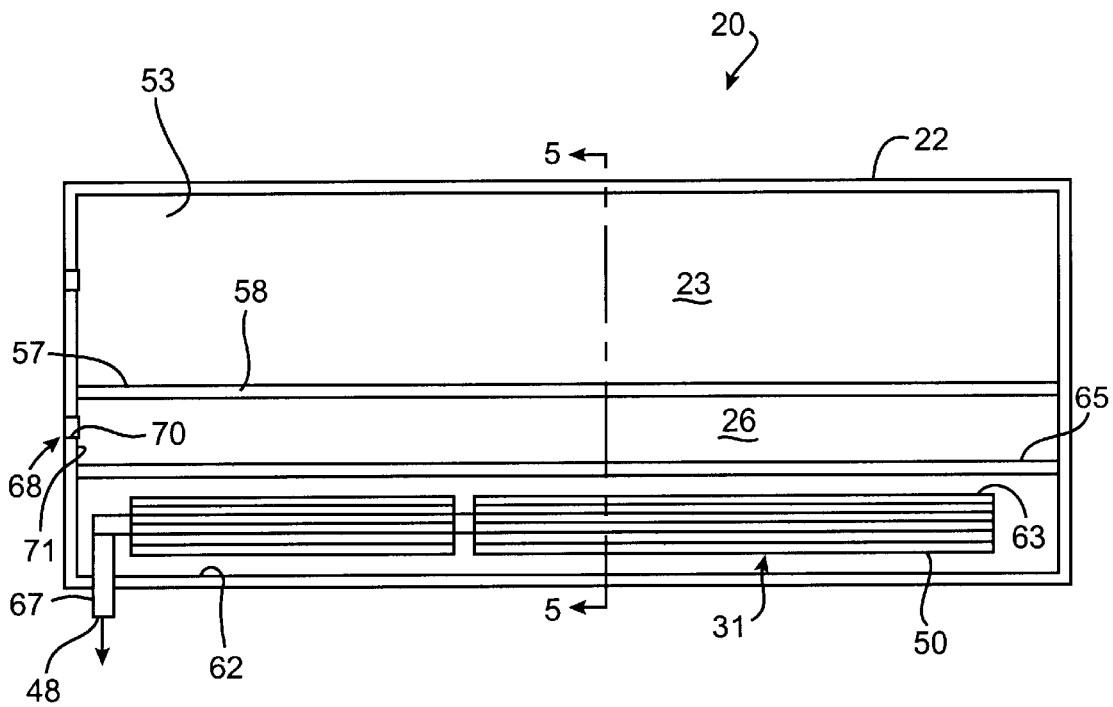
FIG. 4 is a top perspective view of the containment assembly of FIG. 3.

As shown in FIG. 4, the elongated filter device 50 is disposed longitudinally in the filter compartment 62 at a disposition fully submerged beneath the washing fluid 66 therein. This arrangement provides a continuous reservoir of washing fluid 66 to an inlet side 63 of the filter device 50. The outlet side 48 of the filter device 50 is then fluidly coupled to the pressure pump (not shown) through a pump intake tube 67 which in turn is operationally coupled to the pressure washer 21.

In the preferred embodiment, the filter device 50 is provided by one or more stick-type filters 50 disposed in an end-to-end. Each filter stick 50 includes a pleated-type filter material which defines the inlet side 63 thereof. The outlet side 48 is at the central core of the pleated-type filter requiring the washing agent to pass through the filter material during operation for filtering thereof. In the preferred form, these filters are provided to remove the smaller particulates, still suspended in the washing agent, on the order of approximately a 1 micron to approximately a 100 microns. One such conventional pleated cellulose, or polypropylene filter-sticks, for example, are those commercially available from Met Pro Corporation, Keystone Filter Division, Hatfield, Pa.

In the alternative, however, the filter compartment 62 may be provided by filter canisters or the like which are separate from the collection basin. In this configuration, the canisters would be fluidly coupled to the containment compartment for extraction of the washing fluids therein.

Eventually, it is desirable to periodically remove the accumulated light weight contaminants from the containment compartment 26. This is best performed by introducing a skimming device 68 to withdraw the light weight contaminants from the containment compartment 26. To assist removal, the elongated containment compartment 26 is dimensioned to have a width which is relatively narrow. By substantially reducing the width dimension of the containment compartment 26, the height dimension of the accumulated light weight contaminants 29 therein will proportionately increase. This dimensional increase facilitates removal since a proportionately thicker layer of light weight contaminants 29 atop the surface 35 of the contained washing fluids 30 can be accessed.

In the preferred embodiment, the skimming device 68 is provided by a discard port 70 strategically positioned at an elevation which is at least above the range of the operational fluid level of the contained washing fluids in the containment compartment 26. The operational fluid level of the contained washing fluids in the containment compartment 26 may be determined by fluid relationship with the operational fluid level of the washing fluids in the filter compartment 62. As the operational fluid level of the washing fluids in the filter compartment 62 may be controlled by removal rate therefrom by the pressure pumps in addition to washing fluid volumes in the pressure washer system, the discard port 70 may be anticipated relative to these parameters. In this manner, the amount of contained washing fluid 30 which will be inadvertently removed through the discard port 70 will be substantially minimized. Preferably, the discard port 70 is oriented at an end of the containment compartment 26, and is positioned about ½ inch to about 1 inch above the anticipated operational fluid level of the contained washing fluids 30 therein.

Accordingly, as the contained lightweight contaminants 29 accumulate in the containment compartment 26 and rise during operation, the light weight contaminants are urged into fluid communication with the discard port 70. Moreover, as the washing fluid from the settling compartment 23 flows into the containment compartment 26, the accumulation of the washing fluid 30 therein rises to further urge the light weight contaminants 29 into fluid communication with the discard port 70 for removal thereof.

The discard port 70 may be fluidly coupled to a storage compartment (not shown) to store the light weight contaminants removed from the containment compartment. Such removal may be performed by natural gravity flow through the discard port, or through pumps or other suction devices.

It will further be appreciated that any skimming device may be employed, such as a conventional belt skimmer, to remove the accumulated lightweight contaminants without departing from the true spirit and nature of the present invention.

Figure 6:
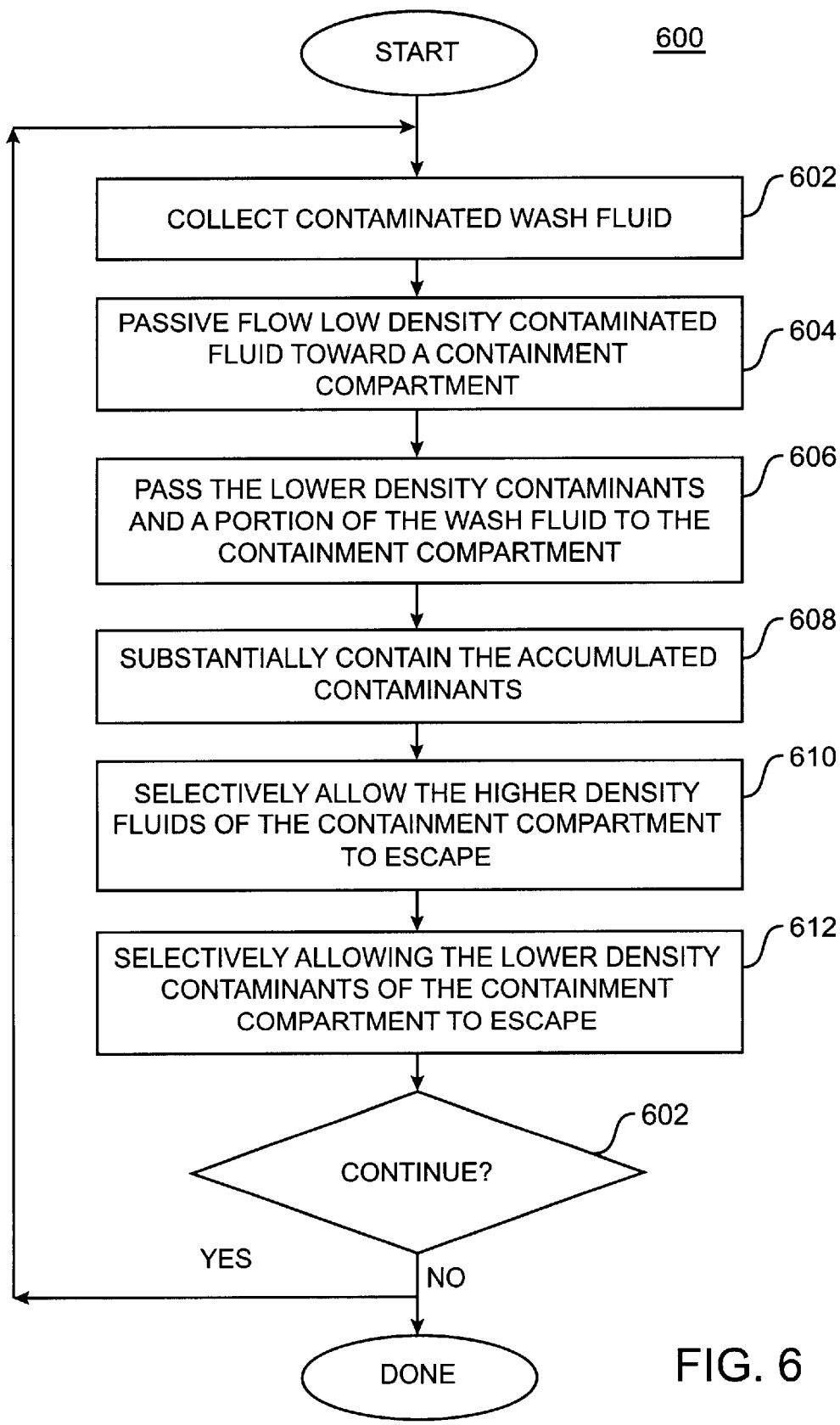
FIG. 6 is a flowchart illustrating the isolation and removal of contaminants according to a specific embodiment of the invention.

The removal of low-density contaminants from the washing fluid according to a specific embodiment of the invention will now be described with reference to flowchart 600 of FIG. 6. Contaminated washing fluid is collected in the settling compartment 23 after being washing the object (step 602). The contaminated washing fluid may include solid and liquid contaminants whose densities are higher and lower relative to the washing fluid. The fluid level in the settling compartment 23 may be maintained such that an upper portion of the fluid, corresponding to the lower density fluids and particles, is continually maintained above a preset opening leading to the containment compartment 26. Thus, the established pressure gradient allows for the upper portion of the fluid in the settling compartment 23 to be passively flowed toward the containment compartment 26 (step 604). In this manner, the lower density contaminants will float to the top of the settling compartment 23 and pass, with some of the washing fluid 30, to the containment compartment 26 (step 606). Preferably, the velocity of the fluid into the accumulating chamber is slow in order to facilitate separation of the contaminants from the washing fluid in the collecting chamber.

In the containment compartment 26, the low-density contaminants will accumulate (step 608) as the washing fluid is selectively removed from the accumulating chamber (step 610). Preferably, backflow to the settling compartment 23 is prevented and the contaminants are substantially contained within the containment compartment 26. In one embodiment, the washing fluid is selectively removed from the containment compartment 26 based on its higher density relative to the contaminants in the containment compartment 26, through an exit substantially near the bottom of the containment compartment 26. The washing fluid 30 at this point may additionally be filtered for smaller contaminants before reuse. The low-density contaminants are also selectively removed from the containment compartment 26 (step 612). In one embodiment, the discard port 70 is used to remove the low-density contaminants wherein the height of the discard port 70 is estimated according to the operating fluid levels in the filter compartment 62.

The process 600 may be maintained as long as necessary. As the entire process of low density contaminant removal as described with reference to flowchart 600 is passive, the process may be continued as long as the pressure pump is removing washing fluid from the filter compartment 62 and reintroducing it to the settling compartment 23.

An advantage of the proposed invention is that oils and lighter contaminant fluids are isolated from the settling compartment 23 and the remaining mechanical structures of the pressure washing mechanism. In contrast, prior art separating techniques perpetuate the presence of low-density contaminant fluids in the settling compartment 23 which can be detrimental when the pressure washing mechanism is turned off. In this case, the lighter contaminant fluids may uncontrollably disburse to undesired mechanisms such as motors and valves.

The proposed invention allows for improved performance of heavy sediment handling. As low-density contaminant efficiency increases, the heavy sediment holding capacity of the settling compartment 23 increases. In addition, the proposed invention also advantageously retains all the heavy oils in the settling compartment 23 to facilitate removal thereof.

In general, the features of the washing apparatus described above may vary depending upon the requirements of a particular pressure washing apparatus. By way of example, the size of the any of the components of the apparatus may be increased or decreased to accommodate the pressure washer in which the described invention is implemented in. Alternately, it should be appreciated that the barrier, fluid exits, settling compartment 23 and corresponding connecting structures may take on various other configurations, shapes and structures. Specifically, the components may be used in pressure washers in which walls, i.e., beams or baffles, within a tub take on a variety of different configurations.

Although only a few embodiments of the present invention have been described, it should be understood that the present invention may be embodied in many other specific forms without departing from the spirit or scope of the invention. By way of example, flow control valves may be used in order to regulate fluid levels in the settling compartment 23. Similarly, the location the exits may also be varied and other forms of fluid level control may be implemented. In addition, other means of removing the low density contaminants from the containment compartment 26 may be used other than the passive exit which is sensitive to the fluid levels of the filtering device. For example, the skimmer 68 may be plugged and the low-density contaminant manually removed by the operator. In this manner, the oil and water may be allowed to separate over a period of time and the oil removed days later before the pump is turned on again, which would allow maximum separation of the fluid and contaminant.

While this invention has been described in terms of several preferred embodiments, there are alterations, permutations, and equivalents which fall within the scope of this invention. By way of example, the chamber need that feeds flow to the settling compartment 23 need not be the collecting compartment responsible for collecting contaminated washing fluid from the object being washed. Alternatively, the exit form the collecting compartment to the settling compartment 23 may be an opening in a wall or hose and not a barrier. It is therefore intended that the following appended claims be interpreted as including all such alterations, permutations, and equivalents as fall within the true spirit and scope of the present invention.

What is claimed is:

1. A containment assembly for use with a pressure washing apparatus for washing an object having a contaminant comprising:

a settling compartment adapted to collect the run-off of a washing fluid after being flowed over the object to remove the contaminant wherein the relatively lightweight contaminants in the collected washing fluid are caused to gravitate to the surface of the collected washing fluid therein;

a containment compartment in gravity flow fluid communication with the surface of the collected washing fluid in the settling compartment such that the lightweight contaminants at the surface thereof flow into the containment compartment for containment of the lightweight contaminants and the washing fluid therein; and a fluid extraction assembly in fluid communication with the contained washing fluid in said containment compartment through an opening therein vertically disposed below a predetermined operational fluid level of the contained washing fluid, said extraction assembly being adapted to extract the contained washing fluid through the opening in a manner maintaining said gravity flow of the collected washing fluid into the containment compartment.

2. The containment assembly in accordance with claim 1, wherein said settling compartment includes a containment weir having an upper ledge portion formed and dimensioned to prevent said gravity flow of the collected washing fluid therein into the containment compartment when the surface thereof is substantially at or below the elevation of said upper ledge portion, said upper ledge portion further being configured to enable the surface of the collected washing fluid to gravity flow thereover and into the containment compartment when the surface thereof is above the elevation of said upper ledge portion.

3. The containment assembly in accordance with claim 2, wherein said upper ledge portion of the containment weir is oriented to retain the surface of collected washing fluid in said settling compartment at an elevation above the surface of the contained washing fluid in the containment compartment to enable said gravity flow.

4. The containment assembly in accordance with claim 3, wherein said upper ledge portion is adapted to facilitate uniform flow over the width thereof.

5. The containment assembly in accordance with claim 4, wherein said upper ledge portion includes a felt layer to achieve said uniform flow.

6. The containment assembly in accordance with claim 2, wherein said settling compartment is configured to create a substantially uniform, relatively slow, non-turbulent flow toward the upper ledge portion such that the relatively lightweight contaminants in the collect washing fluid are caused to float to the surface therein, and the relatively heavyweight contaminants in the collected washing fluids are caused to substantially settle toward a bottom of said settling compartment.

7. The containment assembly in accordance with claim 1, wherein said fluid extraction assembly includes a filter compartment in fluid communication with said containment compartment through said opening to provide a reservoir of washing agent to the pressure washer.

8. The containment assembly in accordance with claim 7, wherein said fluid extraction assembly further includes a filter device having an inlet side in fluid communication with the washing fluid collected in said filter compartment, and an outlet side adapted to provide filtered washing fluid from the filter compartment to the pressure washing apparatus.

9. The containment assembly in accordance with claim 8, wherein the filtering device includes a pleated filter member.

10. The containment assembly in accordance with claim 9, wherein said pleated filter member is provided by an elongated stick filter.

11. The containment assembly in accordance with claim 1, wherein said containment compartment includes a skimming device adapted to remove the contained lightweight contaminants therein.

12. The containment assembly in accordance with claim 11, wherein said skimming device includes a discard port in fluid communication with the contained lightweight contaminants in the containment compartment for extraction thereof.

13. The containment assembly in accordance with claim 12, wherein said discard port is disposed at an elevation above the predetermined operation fluid level.

\* \* \* \* \*